United States Patent
Kim et al.

(10) Patent No.: US 10,160,486 B2
(45) Date of Patent: Dec. 25, 2018

(54) STEERING SYSTEM AND METHOD FOR CONTROLLING STEERING SYSTEM

(71) Applicant: HANWHA LAND SYSTEMS CO., LTD., Changwon-si (KR)

(72) Inventors: Min Su Kim, Changwon-si (KR); Jong Yoon Peck, Changwon-si (KR); Jin Suk Park, Changwon-si (KR)

(73) Assignee: HANWHA LAND SYSTEMS CO., LTD., Changwon-si (KR)

( * ) Notice: Subject to any disclaimer, the term of this patent is extended or adjusted under 35 U.S.C. 154(b) by 226 days.

(21) Appl. No.: 15/031,053

(22) PCT Filed: Sep. 1, 2014

(86) PCT No.: PCT/KR2014/008131
§ 371 (c)(1),
(2) Date: Apr. 21, 2016

(87) PCT Pub. No.: WO2015/060534
PCT Pub. Date: Apr. 30, 2015

(65) Prior Publication Data
US 2016/0264174 A1    Sep. 15, 2016

(30) Foreign Application Priority Data
Oct. 23, 2013 (KR) .................. 10-2013-0126729

(51) Int. Cl.
*B62D 6/08* (2006.01)
*B62D 15/02* (2006.01)
(Continued)

(52) U.S. Cl.
CPC ............. *B62D 6/08* (2013.01); *B60G 3/20* (2013.01); *B62D 7/14* (2013.01); *B62D 15/023* (2013.01);
(Continued)

(58) Field of Classification Search
None
See application file for complete search history.

(56) References Cited

U.S. PATENT DOCUMENTS 6,135,231 A    10/2000    Reed
2002/0070520 A1    6/2002    Osborn et al.
(Continued)

FOREIGN PATENT DOCUMENTS

KR    1998-081492 A    11/1998
KR    10-0269554 B1    11/2000
(Continued)

OTHER PUBLICATIONS

US 6,079,110, 06/2000, Chino et al. (withdrawn)
(Continued)

*Primary Examiner* — Jonathan M Dager
*Assistant Examiner* — Garrett F Evans
(74) *Attorney, Agent, or Firm* — Sughrue Mion, PLLC (57) ABSTRACT

A steering system includes a fixing part connected to a frame, a wheel part into which a part of the fixing part is inserted to perform a relative motion and on which a wheel is provided, and a sensor provided between the wheel part and the fixing part and measuring an error angle of the wheel part with respect to a preset initial position of the wheel part.

12 Claims, 7 Drawing Sheets

(51) Int. Cl.
  *B60G 3/20* (2006.01)
  *B62D 7/14* (2006.01)
  *B60G 3/26* (2006.01)
(52) U.S. Cl.
  CPC .......... *B60G 3/26* (2013.01); *B60G 2200/144* (2013.01); *B60G 2200/44* (2013.01); *B60G 2206/50* (2013.01); *B60G 2800/24* (2013.01)

(56) References Cited

U.S. PATENT DOCUMENTS

| | | |
|---|---|---|
| 2004/0129491 A1 | 7/2004 | Bean et al. |
| 2006/0022420 A1* | 2/2006 | Pressler ............... B62D 15/023 280/93.512 |
| 2006/0151968 A1* | 7/2006 | Kim ........................ B60G 7/02 280/86.757 |
| 2008/0027609 A1* | 1/2008 | Aoki .................... B62D 5/0463 701/43 |
| 2010/0320706 A1* | 12/2010 | Horiguchi .............. B60G 7/006 280/5.521 |
| 2011/0106382 A1* | 5/2011 | Kageyama ............. B62D 5/008 701/42 |

FOREIGN PATENT DOCUMENTS

| | | |
|---|---|---|
| KR | 10-2001-0111133 A | 12/2001 |
| KR | 10-2011-0071973 A | 6/2011 |
| KR | 10-2012-0067561 A | 6/2012 |

OTHER PUBLICATIONS

International Search Report for PCT/KR2014/008131 dated Dec. 17, 2014 [PCT/ISA/210].
Written Opinion for PCT/KR2014/008131 dated Dec. 17, 2014 [PCT/ISA/237].

* cited by examiner

STEERING SYSTEM AND METHOD FOR CONTROLLING STEERING SYSTEM

CROSS-REFERENCE TO RELATED APPLICATIONS

This application is a national stage entry of International Application No. PCT/KR2014/008131, filed on Sep. 1, 2014, and claims the benefit of Korean Patent Application No. 10-2013-0126729, filed on Oct. 23, 2013 in the United States Patent and Trademark Office, the disclosures of which are incorporated herein by reference in their entireties.

TECHNICAL FIELD

The present invention relates to a system and a method, and more particularly, to a steering system and a method of controlling the steering system.

BACKGROUND ART

A steering system is an apparatus installed on a movable object to steer the movable object in a desired direction. For example, a steering system may be installed on a vehicle or a mobile robot. The steering system may change a moving direction of the vehicle or mobile robot.

The steering system may be formed in various ways and generally include an input part for receiving an input of an external driving force, a linear motion part for performing a linear motion according to the driving force input from the input part, and a turning part connected to both ends of the linear motion part to turn wheels installed thereon. The input part of the steering system configured as above may be a handle.

Regarding the directivity of the vehicle or mobile robot, it is very important to check how the angle of a wheel in the steering system changes according to a value input from the input part. Furthermore, when a wheel deviates from an initial position due to an external force, an actual measurement thereof may be difficult and thus a difference may be generated between a degree of a steering input through the input part and an actual amount of turning of the wheel.

Korean Patent Publication No. 2013-0057879 (Title of the invention: Steering System Malfunction Detection Apparatus and Method; Applicant: Hyundai Mobis Co., Ltd.) discloses in detail a general steering system and technology to measure a steering angle.

DETAILED DESCRIPTION OF THE INVENTIVE CONCEPT

Technical Problem

The present inventive concept provides a steering system and a method of controlling the steering system.

Technical Solution

According to an aspect of the present inventive concept, there is provided a steering system including a fixing part connected to a frame, a wheel part into which a part of the fixing part is inserted to perform a relative motion and on which a wheel is provided, and a sensor provided between the wheel part and the fixing part and measuring an error angle of the wheel part with respect to a preset initial position of the wheel part.

The wheel part may include a body part provided to perform a relative motion with respect to the fixing part, a cover coupled to the body part and fixing the fixing part to be capable of a relative motion, and a wheel connected to the body part and on which the wheel is provided.

The wheel part may include a movement restriction part provided at least one of the body part and the cover and restricting a turning angle of the wheel part by selectively contacting the fixing part during a movement of the wheel part.

The movement restriction part may protrude toward the fixing part.

The sensor may include a signal generator provided on one of the fixing part and the wheel part, and a signal receiver provided on the other one of the fixing part and the wheel part and detecting a turning angle of the signal generator.

The steering system may further include an input part externally receiving an input of a steering signal, a steering actuation portion connected to the wheel part and turning the wheel part by generating a steering force, and a controller calculating a control steering angle of the wheel part based on the steering signal, calculating an actual steering angle for steering the wheel part based on the control steering angle and an error angle of the wheel part measured by the sensor, and controlling the steering actuation portion to generate the steering force calculated according to the actual steering angle.

The fixing part may include a linking part connected to the frame, and a support frame provided on the linking part and rotatably inserted in the wheel part.

The steering system may further include a bush provided between the support frame and the wheel part.

The sensor may measure a turning angle of the wheel part from an initial position of the error angle, and the steering system may further include an input part externally receiving an input of a steering signal, a steering actuation portion connected to the wheel part and turning the wheel part by generating a steering force, and a controller calculating a control steering angle of a vehicle corresponding to the steering signal, calculating an expected steering angle corresponding to a direction in which the vehicle moves based on the turning angle measured by the sensor, and controlling the steering actuation portion to make the steering angle and the actual steering angle the same so as to turn the wheel part.

According to an aspect of the present inventive concept, there is provided a method of controlling a steering system, which includes sensing an error angle of a wheel part provided on a fixing part to allow a portion of the wheel part to perform a relative motion, and calculating a control steering angle corresponding to a steering signal input from an input part, calculating an actual steering angle to obtain the control steering angle based on the control steering angle and the error angle, and driving a steering actuation portion to turn the wheel part by the actual steering angle.

The wheel part may include a plurality of wheel parts and each of the plurality of wheel parts independently performs the sensing, the calculating, and the driving.

The actual steering angle may be equal to a difference between the control steering angle and the error angle.

According to an aspect of the present inventive concept, there is provided a method of controlling a steering system, which includes calculating a steering angle of a vehicle based on a control signal input from an input part, sensing a turning angle of a wheel part provided on a fixing part to allow a portion of the wheel part to perform a relative motion, calculating an expected steering angle corresponding to a path along the vehicle moves according to the turning angle, and turning the wheel part by driving a steering actuation portion to match the expected steering angle with the steering angle.

The sensing of the turning angle of the wheel part, the calculating of the expected steering angle, and the turning of the wheel part may be sequentially repeatedly performed.

Advantageous Effects

According to the present invention, wheels may be accurately steered corresponding to a steering signal input from an input part by detecting actual positions of the wheels.

MODE OF THE INVENTIVE CONCEPT

The system and method according to an embodiment of the present inventive concept is described in detail with reference to the accompanying drawings. However, the present inventive concept is not limited thereto and it will be understood that various changes in form and details may be made therein without departing from the spirit and scope of the following claims. That is, descriptions on particular structures or functions may be presented merely for explaining embodiments of the present inventive concept.

Terms used in the present specification are used for explaining a specific embodiment, not for limiting the present inventive concept. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Unless defined otherwise, all terms used herein including technical or scientific terms have the same meanings as those generally understood by those of ordinary skill in the art to which the present inventive concept may pertain. The terms as those defined in generally used dictionaries are construed to have meanings matching that in the context of related technology and, unless clearly defined otherwise, are not construed to be ideally or excessively formal.

Terms such as "first" and "second" are used herein merely to describe a variety of constituent elements, but the constituent elements are not limited by the terms. Such terms are used only for the purpose of distinguishing one constituent element from another constituent element.

The steering system described below may be installed on various apparatuses. For example, the steering system may be installed on vehicles, mobile robots, special purpose vehicles, military equipment, or construction equipment. The steering system is not limited to the above descriptions and may be installed on other apparatuses capable of moving. However, in the following description, for convenience of explanation, a steering system installed on a vehicle such as an automobile is mainly described in detail.

Figure 1:
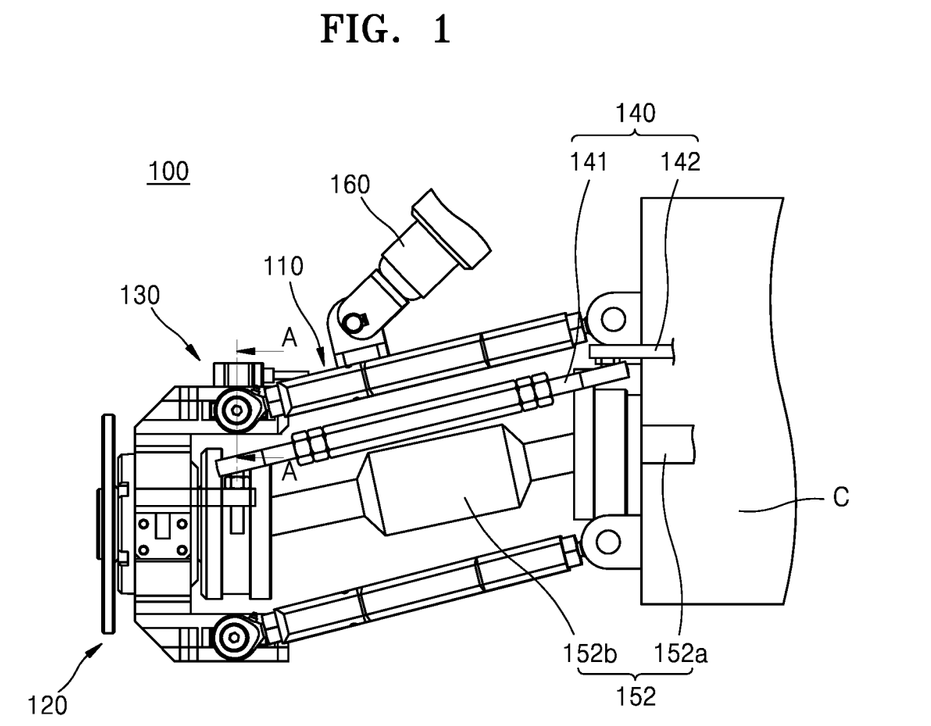
FIG. 1 is a front side view of a steering system according to an embodiment.
Figure 2:
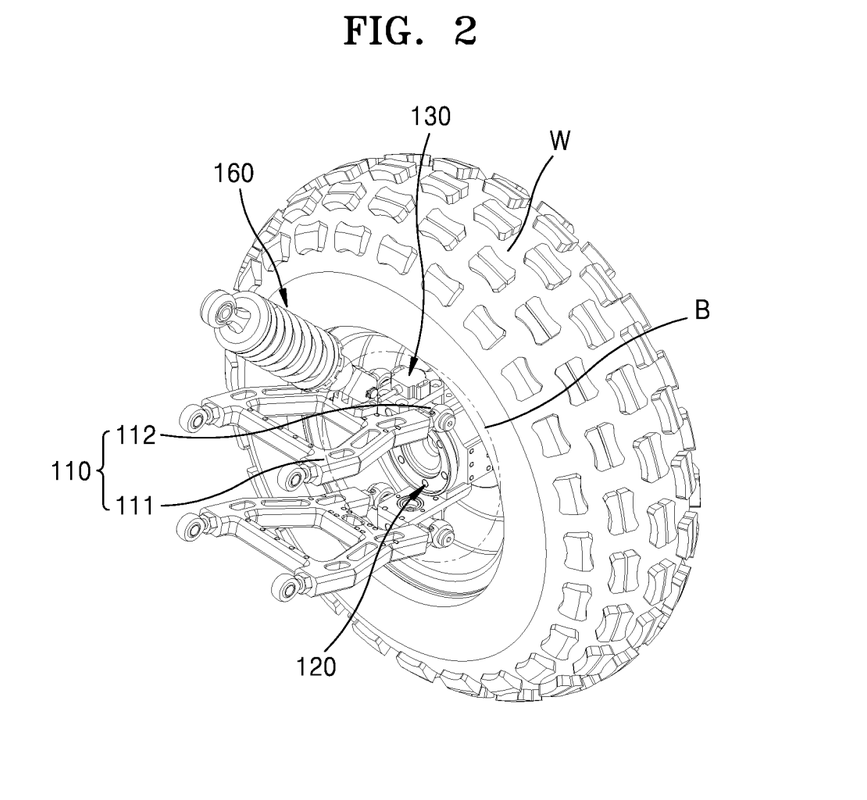
FIG. 2 is a perspective view of a part of the steering system of FIG. 1.
Figure 3:
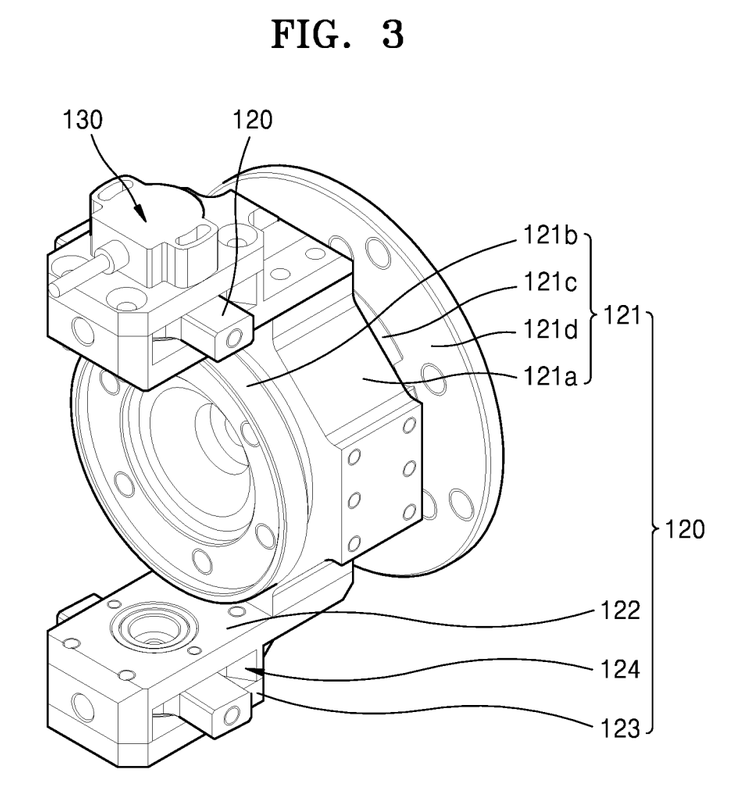
FIG. 3 is an enlarged perspective view of a portion B of FIG. 2.
Figure 4:
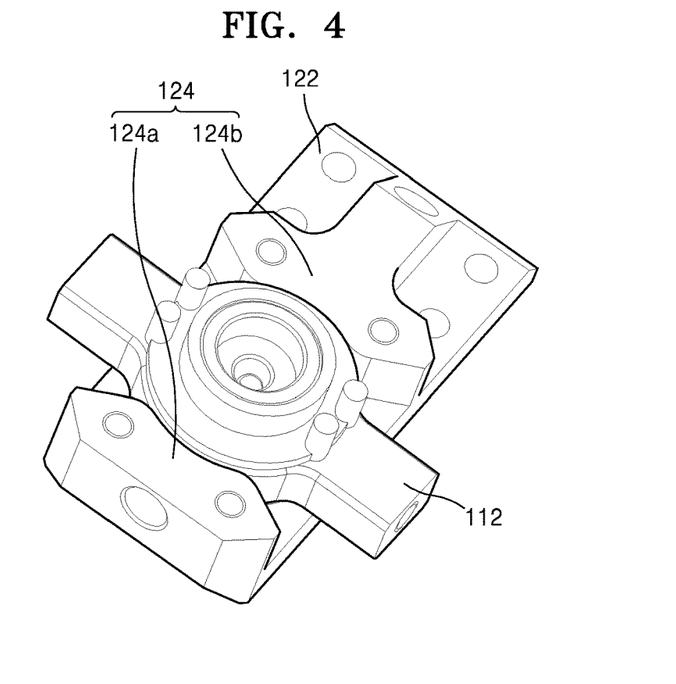
FIG. 4 is a perspective view of a body part and a support frame of FIG. 3.
Figure 5:
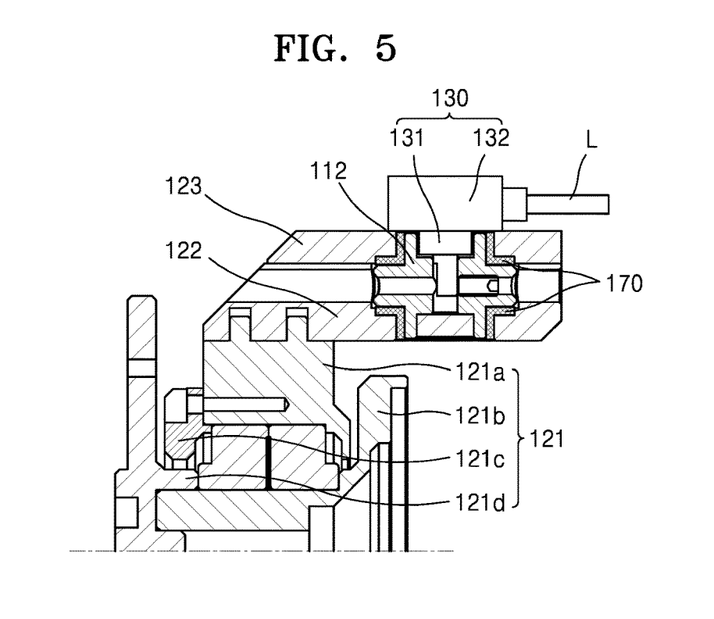
FIG. 5 is a cross-sectional view taken along a line A-A of FIG. 1.

FIG. 1 is a front side view of a steering system 100 according to an embodiment. FIG. 2 is a perspective view of a part of the steering system 100 of FIG. 1. FIG. 3 is an enlarged perspective view of a portion B of FIG. 2. FIG. 4 is a perspective view of a body part 122 and a support frame 112 of FIG. 3. FIG. 5 is a cross-sectional view taken along a line A-A of FIG. 1.

Referring to FIGS. 1 to 5, the steering system 100 may include a fixing part 110 connected to a frame C. The steering system 100 may include a wheel part 120 enabling a part of the fixing part 110 to perform a relative motion and having a wheel W(Ex, tire) provided thereon.

Also, the steering system 100 may include a sensor 130 provided between the wheel part 120 and the fixing part 110 and measuring an error angle of the wheel part 120 with respect to a preset initial position of the wheel part 120. The steering system 100 may include an input part (not shown) for receiving an external steering signal. The input part may be formed in various ways. For example, the input part may include a handle or button, a pedal, a portable terminal such as a mobile phone. However, in the following description, for convenience of explanation, a case in which the input part includes a handle is mainly described in detail.

The steering system 100 may include a steering actuation portion 140 connected to the wheel part 120 and rotating the wheel part 120 by generating a steering force. Also, the steering system 100 may include a driving portion (not shown) connected to the wheel part 120 and transferring a driving force to the wheel part 120. In this state, while the steering actuation portion 140 may steer a vehicle, the driving portion may drive the vehicle to move forward or backward.

The steering actuation portion 140 may include a steering force generator 142 generating a steering force in response to a steering signal input through the input part, and a steering rod 141 connecting the steering force generator 142 and the wheel part 120. The steering force generator 142 may be formed in various ways. For example, the steering force generator 142 may include a motor or cylinder. Also, the steering rod 141 may be rotatably provided between the wheel part 120 and the steering force generator 142. In the following description, for convenience of explanation, a case in which the steering force generator 142 includes a cylinder is mainly described in detail.

The driving portion may include a driving force generator (not shown) for generating a driving force and a driving force transfer part 152 connected to the driving force generator and the wheel part 120, thereby transferring the driving force. The driving force generator may include a general engine. Also, the driving force transfer part 152 may include a rotating rod 152a connected to the driving force generator and transferring the driving force of the driving force generator, and a transfer rod 152*b* connected to the rotating rod 152*a* and rotatably connected to the wheel part 120, thereby transferring rotation of the rotating rod 152*a* to the wheel part 120. In this state, the transfer rod 152*b* may prevent disconnection of the wheel part 120 and the rotating rod 152*a* from each other during turning of the wheel part 120. Since the above-described driving portion is the same as or similar to the driving portion of a general vehicle, a detailed description thereof is omitted.

The steering system 100 may include a controller (not shown) controlling a steering angle of the wheel part 120 based on a steering signal input through the input part. The controller may control the steering actuation portion 140 to fit to an actual steering angle by calculating a position of the wheel part 120, a control steering angle corresponding to the steering signal, and an actual steering angle required to rotate the wheel part 120 by the control steering angle.

The fixing part 110 may include a linking part 111 connected to the frame C. The linking part 111 may be rotatably connected to the frame C and the support frame 112 that is described later. In particular, the linking part 111 may connect the wheel part 120 to the frame C so that the wheel W may move up and down during driving of a vehicle.

A suspension 160 for absorbing a shock transferred to the wheel part 120 through the wheel W may be provided on the linking part 111. In this case, the suspension 160 may include all types of structures capable of absorbing a shock to the wheel W in general robot apparatuses or vehicles.

The fixing part 110 may include the support frame 112 provided on the linking part 111 and rotatably inserted in the wheel part 120. The support frame 112 may be rotatably arranged between a body part 122 and a cover 123, which are described later. A rotation center portion of the support frame 112 may have a circular column shape. Furthermore, the support frame 112 outwardly protrudes from a center portion thereof out of the body part 122 and the cover 123, forming a bar shape.

The wheel part 120 may include a wheel assembly 121 where the wheel W is provided. The wheel assembly 121 may include a knuckle 121*a* connected to the body part 122 to be described later, an inner hub 121*b* connected to the transfer rod 152*b* and rotatably inserted into the knuckle 121*a*, an outer hub 121*c* fixedly provided on the knuckle 121*a*, and a hub cap 121*d* arranged outside the outer hub 121*c* to be fixed on an end portion of a shaft of the inner hub 121*b* and having the wheel W provided thereon. A bearing may be provided between the shaft of the inner hub 121*b* and the knuckle 121*a*. Also, the hub cap 121*d* may have a disc shape, and a brace unit (not shown) for stopping or decelerating the turning of the wheel assembly 121 by using a contact method or a hydraulic method may be provided on the hub cap 121*d*.

The wheel part 120 may include the body part 122 that enables the fixing part 110 to perform the relative motion. In this state, the body part 122 may be connected to the wheel assembly 121. Also, the support frame 112 may be rotatably provided on the body part 122.

The wheel part 120 may include the cover 123 that is coupled to the body part 122 to combine the support frame 112. In this state, since a part of the body part 122 and the cover 123 are spaced apart from each other to a degree, the body part 122 and the cover 123 may be prevented from interfering with the support frame 112 during the turning of the wheel part 120.

The wheel part 120 may include a movement restriction part 124 provided on at least one of the body part 122 and the cover 123 and restricting a turning angle of the wheel part 120 by selectively contacting the fixing part 110 during the turning of the wheel part 120. In this state, the movement restriction part 124 may be formed in various ways. For example, the movement restriction part 124 may have a bar shape provided between the body part 122 and the cover 123. In another embodiment, the movement restriction part 124 may protrude from one of the body part 122 and the cover 123 toward the other one of the body part 122 and the cover 123. In another embodiment, the movement restriction part 124 may protrude from both of the body part 122 and the cover 123 to contact each other. The movement restriction part 124 is not limited to the above descriptions and may include any apparatuses or structures capable of restricting the turning angle of the wheel part 120 during the turning of the wheel part 120. However, in the following description, for convenience of explanation, a case in which the movement restriction part 124 is integrally formed with the body part 122 to protrude from the body part 122 toward the cover 123 is mainly described in detail.

The movement restriction part 124 may contact one surface of the cover 123 and fix the cover 123 by using a coupling member such as a bolt provided to penetrate through the cover 123.

Furthermore, the movement restriction part 124 may restrict the error angel of the wheel part 120 so that the wheel part 120 may turn within a certain angular range during the turning of the wheel part 120. In detail, the movement restriction part 124 may be provided in a multiple number to face the body part 122. For example, the movement restriction part 124 may include a first movement restriction part 124*a* and a second movement restriction part 124*b*, which are formed on the body part 122 to face the first movement restriction part 124*a*.

Since the first movement restriction part 124*a* and the second movement restriction part 124*b* may be formed to be the same as or similar to each other, in the following description, for convenience of explanation, the first movement restriction part 124*a* is mainly described in detail.

A surface of the first movement restriction part 124*a* contacting the support frame 112 may be a curved surface. In this state, the surface of the first movement restriction part 124*a* that selectively contacts the support frame 112 may have a center portion formed inwardly indented and have a gull wing shape as a whole.

In the first movement restriction part 124*a* and the second movement restriction part 124*b* formed as above, a gap in a center portion between the first movement restriction part 124*a* and the second movement restriction part 124*b* may be larger than a gap in an outer edge portion between the first movement restriction part 124*a* and the second movement restriction part 124*b*. In this state, a distance between the first movement restriction part 124*a* and the second movement restriction part 124*b* may increase from the center portion toward the outer edge portion of the body part 122. Accordingly, when the wheel part 120 and the support frame 112 perform a relative motion with each other, the turning angle of the wheel part 120 may be restricted within a certain range.

A bush 170 may be provided between the support frame 112 and the wheel part 120. In particular, the bush 170 may be provided between at least of the support frame 112 and the body part 122, and the support frame 112 and the cover 123. The bush 170 may prevent abrasion of the support frame 112 as the support frame 112 contacts at least one of the body part 122, and the cover 123 during the relative motion of the support frame 112 and the wheel part 120, and may reduce a frictional force between the support frame 112 and at least one of the body part 122 and the cover 123.

The sensor 130 may include a signal generator 131 that is provided on at least one of the fixing part 110 and the wheel part 120. Also, the sensor 130 may include a signal receiver 132 provided on one of the fixing part 110 and the wheel part 120 and detecting a turning angle of the signal generator 131.

The signal generator 131 and the signal receiver 132 may perform a relative motion like the fixing part 110 and the wheel part 120. For example, when the signal generator 131 is stopped, the signal receiver 132 may rotate. When the signal generator 131 is turned, the signal receiver 132 may be stopped.

The signal generator 131 and the signal receiver 132 may be fixed at various positions on the fixing part 110 and the wheel part 120. For example, the signal generator 131 may be provided on the body part 122 or the cover 123, which are turned, whereas the signal receiver 132 may be provided on the support frame 112 or the linking part 111. However, the positions of the signal generator 131 and the signal receiver 132 are not limited thereto and the signal generator 131 and the signal receiver 132 may be provided at opposite positions. However, in the following description, for convenience of explanation, a case in which the signal receiver 132 is provided on the cover 123 and the signal generator 131 is provided on the support frame 112 is mainly described in detail.

The signal receiver 132 may be fixed on the cover 123 by means of a coupling member such as a bolt. The signal generator 131 may be fixed on the support frame 112 by means of a coupling member such as a bolt. In this state, a coupling portion (not shown) may be formed in the signal receiver 132 so that the coupling member such as a bolt may be inserted in the coupling portion. A slot may be formed in the coupling portion to appropriately adjust the position of the coupling member such a bolt. Also, an insertion hole into which the coupling member such as a bolt is inserted may be formed in the signal generator 131 to fix the signal generator 131 on the support frame 112.

The signal generator 131 and the signal receiver 132 configured as above may be formed in various ways. For example, the signal generator 131 may generate a magnetic force to be radiated outwardly and the signal receiver 132 may detect the magnetic force. In another example, the signal generator 131 may be formed in a switch form, and the signal receiver 132 may detect a turning angle by identifying the operation of a switch during the turning of the signal generator 131. In addition, in another example, the signal generator 131 may outwardly radiate light and the signal receiver 132 may detect a turning angle by detecting the light radiated from the signal generator 131. In this state, the signal generator 131 and the signal receiver 132 are not limited thereto and may include any apparatuses or structures capable of measuring a turning angle of one of the signal generator 131 and the signal receiver 132 with respect to an initial position according to the relative motion of the signal generator 131 and the signal receiver 132.

The signal receiver 132 may be connected to the controller via a cable L to transmit the detected turning angle of the signal generator 131 to the outside. In this state, the signal receiver 132 may be directly connected to the controller via the cable L or wirelessly via a separate transceiving module (not shown). However, in the following description, for convenience of explanation, a case in which the signal receiver 132 is connected to the controller via the cable L is mainly described in detail.

Figure 6:
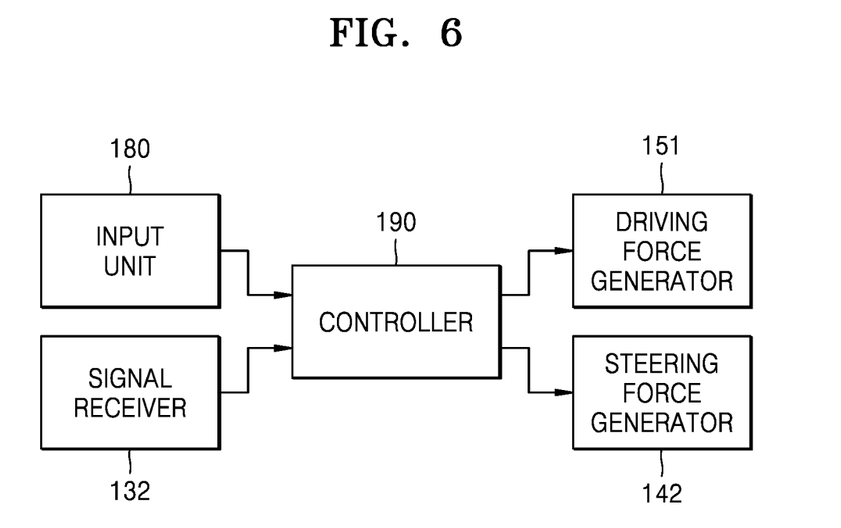
FIG. 6 is a block diagram of a control flow of the steering system of FIG. 1.
Figure 7:
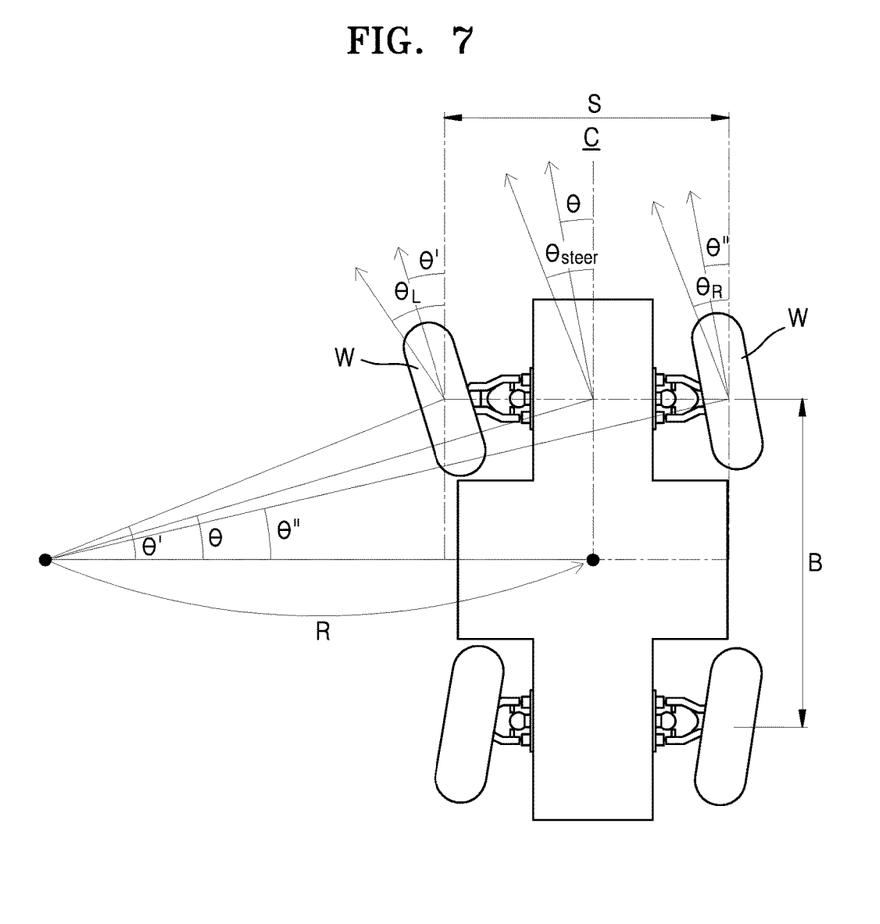
FIG. 7 is a conceptual view of a steering angle of a vehicle equipped with the steering system of FIG. 1.
Figure 8:
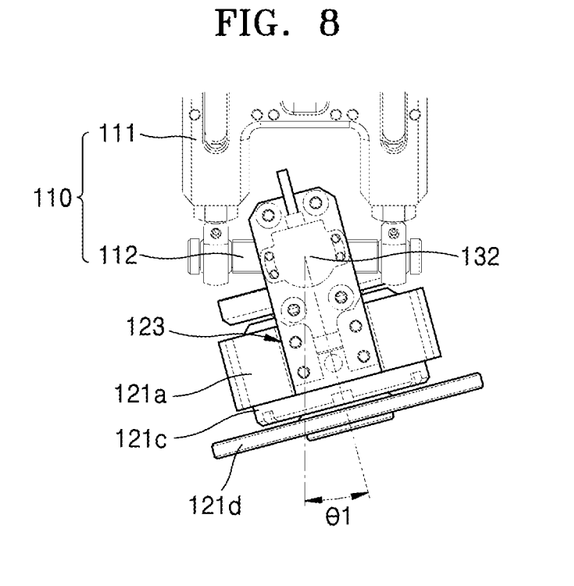
FIG. 8 is a view illustrating an operating state of the steering system of FIG. 1.
Figure 9:
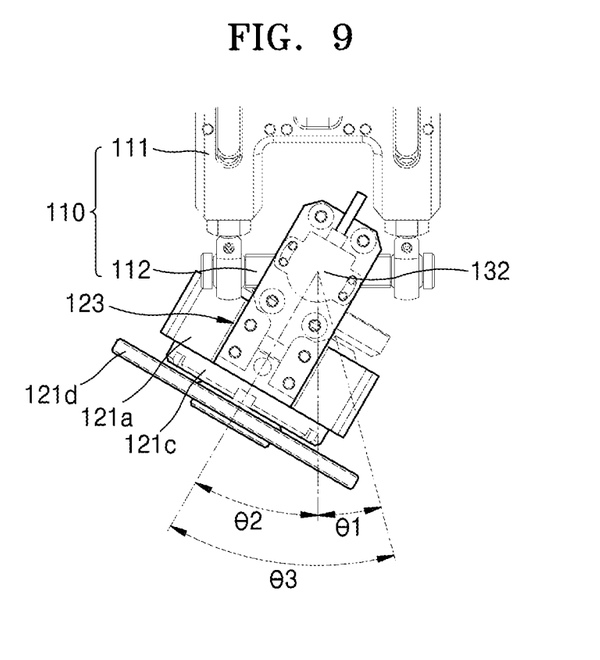
FIG. 9 is a conceptual view of a steering angle of a vehicle according to an angle of a wheel part according to an error angle of each wheel part of the vehicle equipped with the steering system of FIG. 1.

FIG. 6 is a block diagram of a control flow of the steering system 100 of FIG. 1. FIG. 7 is a conceptual view of a steering angle of a vehicle equipped with the steering system 100 of FIG. 1. FIG. 8 is a view illustrating an operating state of the steering system 100 of FIG. 1. FIG. 9 is a conceptual view of a steering angle of a vehicle according to an angle of a wheel part according to an error angle of each wheel part of the vehicle equipped with the steering system of FIG. 1. In the following description, like reference numerals denote like elements.

Referring to FIGS. 6 to 9, when a car C starts to drive or is driving, a controller 190 may control at least one of the steering force generator 142 and a driving force generator 151.

The car C may be steered based on a value input through an input part 180 during driving of the car C. In addition to the input part 180, the steering system 100 may be operated when the car C drives along a preset route. However, in the following description, for convenience of explanation, a case in which the steering system 100 is operated through the input part 180 is mainly described in detail.

When a steering signal is input through the input part 180 as above, the steering signal may be transmitted to the controller 190. The controller 190 may receive the steering signal and calculate the control steering angle θ2 of the wheel part 120 corresponding to the steering signal. The control steering angle θ2 may be an angle by which the wheel part 120 is to be turned with respect to a direction in which the car C advances or a straight line connecting the centers of a front wheel and a rear wheel of the car C. Also, the control steering angle θ2 may be an angle by which a straight line perpendicular to a surface of the hub cap 121d is to be turned with respect to a straight line perpendicular to the support frame 112. In the following description, for convenience of explanation, a case in which the control steering angle θ2 is an angle formed by the straight line perpendicular to the surface of the hub cap 121d with respect to the straight line perpendicular to the support frame 112 is mainly described in detail.

The control steering angle θ2 of each wheel may be calculated by the Ackerman method. In this state, the control steering angle θ2 of each wheel may be calculated according to the steering angle θ at which the car C advances. In detail, with reference to FIG. 7, a control steering angle θ' of a front left wheel of the car C and a control steering angle θ'' of a front right wheel of the car C may be calculated by the following equations.

$$R = \frac{B/2}{\tan\theta} \quad \text{[Equation 1]}$$

$$\theta' = \tan^{-1}\frac{B/2}{R - S/2} \quad \text{[Equation 2]}$$

$$V' = V\frac{B/2}{R\sin\theta'} \quad \text{[Equation 3]}$$

$$\theta'' = \tan^{-1}\frac{B/2}{R + W/2} \quad \text{[Equation 4]}$$

$$V'' = V\frac{B/2}{R\sin\theta''} \quad \text{[Equation 5]}$$

$$(|\theta| > 0.0)$$

In the above equations, "θ" denotes a steering angle of the car C, "θ'" denotes a control steering angle of a left wheel, "θ''" denotes a control steering angle of a right wheel, "R" denotes a distance from a rotation center of the car C to a center of the car C, "B" denotes a distance between a front wheel and a rear wheel, "S" denotes a breadth of the car C (distance between the left wheel and the right wheel), "V" denotes an average speed of the car C, "V'" denotes a velocity of the left wheel, and "V''" denotes a velocity of the right wheel.

The control steering angle θ2 calculated as above may vary for each wheel. Also, the control steering angle θ2 calculated as above may be independently applied to each wheel.

The control steering angle θ2 may be calculated through the above equations or may be stored in the controller 190 in a tabular form corresponding to the steering signal.

When the control steering angle θ2 corresponding to the steering signal is calculated as above, the sensor 130 may detect an error angle θ1 of the wheel part 120 and transmit a detected error angle θ1 to the controller 190. In this state, the error angle θ1 of the wheel part 120 may be an angle by which the wheel part 120 is turned with respect to the direction in which the car C advances or the straight line connecting the center of the front wheel and the center of the rear wheel of the car C, as described above. Furthermore, the error angle θ1 of the wheel part 120 may be an angle formed by the straight line perpendicular to the surface of the hub cap 121d with respect to the straight line perpendicular to the support frame 112, as described above. However, in the following description, for convenience of explanation, a case in which the error angle θ1 of the wheel part 120 is an angle formed by the straight line perpendicular to the surface of the hub cap 121d with respect to the straight line perpendicular to the support frame 112 is mainly described in detail.

The controller 190 may calculate an actual steering angle θ3 through the calculation of the control steering angle θ2, and the error angle θ1. In this state, the actual steering angle θ3 may be the same as the determination of the calculation of the control steering angle θ2 or the error angle θ1.

The control steering angle θ2, the error angle θ1, and the actual steering angle θ3 may have not only size, but also directivity. In the control steering angle θ2, the error angle θ1, and the actual steering angle θ3, a value of turning in one direction with respect to the straight line perpendicular to the support frame 112 may be set to be a positive (+) value and a value of turning in the opposite direction with respect to the straight line perpendicular to the support frame 112 may be set to be a negative (−) value.

For example, the control steering angle θ2, the error angle θ1, and the actual steering angle θ3 may be positive values when the wheel part 120 is turned clockwise with respect to the straight line perpendicular to the support frame 112 and negative values when the wheel part 120 is turned counterclockwise with respect to the straight line perpendicular to the support frame 112.

When the controller 190 calculates the actual steering angle θ3, the actual steering angle θ3 may be calculated based on the control steering angle θ2 with an assistance of the error angle θ1. For example, the controller 190 may be calculated to be actual steering angle θ3 by obtaining a difference between the control steering angle θ2 and the error angle θ1.

In detail, when the car C is delivered to a user, the error angle θ1 is generally set to be 0°. In this state, as the car C is in use, as illustrated in FIGS. 8 and 9, the error angle θ1 may not be 0° due to various factors such as a state of the car C or a ground state.

In the above case, the wheel part 120 may be turned forming a certain angle with respect to an initial position when the error angle θ1 is 0°. When the wheel part 120 is turned as above, the signal receiver 132 foxed on the cover 123 may be turned. In contrast, the signal generator 131 fixed on support frame 112 is in a stopped state, the initial position of the signal generator 131 is changed so that the error angle θ1 may be measured. In particular, when the error angle θ1 is formed as illustrated in FIG. 8, the error angle θ1 may have a negative value.

When the user inputs the steering signal by using the input part 180 to make the control steering angle θ2 have a positive value, the controller 190 may calculate the actual steering angle θ3 through the error angle θ1 and the control steering angle θ2. In this state, the actual steering angle θ3 may be greater than the control steering angle θ2.

For example, when the error angle θ1 is −5° and the control steering angle θ2 is 10°, the actual steering angle θ3 may be 15° that is equivalent to a difference between the error angle θ1 and the control steering angle θ2. In this state, the controller 190 may control the steering force generator 142 to provide the steering force generator 142 with a steering force to form an actual steering angle θ3 of 15° that is greater than the steering force forming the control steering angle θ2 of 10°.

In addition to the above case, the sensor 130 may detect a turning angle (not shown) of the wheel part 120 in real time. In detail, the turning angle may be defined to be an angle by which the wheel part 120 is turned from a position where the error angle θ1 is formed. A method of measuring a turning angle may be the same or similar to the above-described method of measuring the error angle θ1.

The turning angle measured as above may be feedbacked to the controller 190. The controller 190 may calculate the expected steering angle θ$_{steer}$, which is expected to be a direction in which the car C moves, based on the turning angle, and control the steering force generator 142 to correspond to the expected steering angle θ$_{steer}$ and the steering angle θ of the car C.

In detail, when a control signal is input through the input part 180, the controller 190 may calculate the control steering angle θ' of the left wheel, the control steering angle θ'' of the right wheel, the velocity V' of the left wheel, and the velocity V'' of the right wheel, based on Equations 1 to 5. Then, the controller 190 may control the steering force generator 142 of each of the left and right wheels by calculating an actual steering angle (not shown) of the left wheel and an actual steering angle (not shown) of the right wheel through the above process.

When the steering force generator 142 is operated as above, the wheel part 120 may be turned. In this state, the sensor 130 may measure the turning angle of each wheel part 120 and gives a feedback to the controller 190.

The controller 190 may calculate the expected steering angle θ$_{steer}$, corresponding to a direction in which the car C is expected to move, through the turning angle of each wheel part 120, by Equation 6.

$$\theta_{steer} = \frac{(\theta_L + \theta_R)}{2} \quad \text{[Equation 6]}$$

In Equation 6, "$\theta_{steer}$" denotes an expected steering angle corresponding to a direction in which the car C is expected to move, "$\theta_L$" denotes a turning angle of a left wheel part, and "$\theta_R$" denotes a turning angle of a right wheel part. The turning angle $\theta_L$ of the left wheel part and the turning angle $\theta_R$ of the right wheel part may be the same as the actual steering angle of the left wheel part and the actual steering angle of the right wheel part, respectively.

When the expected steering angle $\theta_{steer}$ is calculated as above, the controller 190 may compare the expected steering angle $\theta_{steer}$ and the steering angle $\theta$ according to the control signal. In this state, according to a result of the comparison between the expected steering angle $\theta_{steer}$ and the steering angle $\theta$, the controller 190 may control the steering force generator 142 to make the expected steering angle $\theta_{steer}$ and the steering angle $\theta$ the same as each other.

For example, when the expected steering angle $\theta_{steer}$ is determined to be less than the steering angle $\theta$, the controller 190 may control the steering force generator 142 to increase the turning angle $\theta_L$ of the left wheel part and decrease the turning angle $\theta_R$ of the right wheel part. In contrast, when the expected steering angle $\theta_{steer}$ is determined to be greater than the steering angle $\theta$, the controller 190 may control the steering force generator 142 to decrease the turning angle $\theta_L$ of the left wheel part and increase the turning angle $\theta_R$ of the right wheel part. Since the method of changing a turning angle of each wheel part 120 is the same as or similar to the above-described method, a detailed description thereof is omitted.

The above control method may be repeatedly performed when the car C moves. In this state, the above control method may be repeatedly performed until the expected steering angle $\theta_{steer}$ is the same as the steering angle $\theta$. In addition, the above control method may be performed until the expected steering angle $\theta_{steer}$ and the steering angle $\theta$ match each other.

Accordingly, the steering system 100 may prevent the car C from being deviated from a desired track or path by accurately providing the control steering angle θ2 input through the input part 180 to the car C. In addition, even when the position of the wheel part 120 is off from a desired position due to an external force, the steering system 100 may provide a steering force equivalent to one in an initial state.

While steering the car C as above, the steering system 100 may prevent over-steering. In detail, when the turning angle of the wheel part 120 becomes excessive due to damage to the steering force generator 142 or a change in an external structure, the support frame 112 may be restricted by the first movement restriction part 124a and the second movement restriction part 124b, thereby preventing excessive turning of the wheel part 120.

In particular, when the turning angle of the wheel part 120 is greater than or equal to a first angle and less than or equal to a second angle, the support frame 112 may perform a relative motion with respect to the body part 122 between the first movement restriction part 124a, and the second movement restriction part 124b. In contrast, when the turning angle of the wheel part 120 is less than the first angle or greater than the second, the support frame 112 may prevent turning of the wheel part 120 by contacting at least one of the first movement restriction part 124a and the second movement restriction part 124b.

Accordingly, the steering system 100 may prevent a user from moving out of the car C or rollover of the car C due to excessive steering by preventing excessive steering. In addition, the steering system 100 may stabilize a pose of the car C so that stability and convenience for a user may be secured.

While this inventive concept has been particularly shown and described with reference to preferred embodiments thereof, it will be understood by those of ordinary skill in the art that various changes in form and details may be made therein without departing from the spirit and scope of the inventive concept as defined by the appended claims.

INDUSTRIAL APPLICABILITY

According to the present inventive concept, a steering system and a steering method are provided to commercialize a technology to control a steering angle by measuring the same. The embodiments of the present inventive concept may be applied to special purpose movable equipment such as vehicles, robots, heavy equipment, tanks, etc.

The invention claimed is:

1. A steering system comprising:
a fixing part connected to a frame;
a wheel part into which a part of the fixing part is inserted to perform a relative motion and on which a wheel is provided; and
a sensor provided between the wheel part and the fixing part and measuring an error angle of the wheel part with respect to a preset initial position of the wheel part,
wherein the wheel part comprises:
  a body part provided to perform a relative motion with respect to the fixing part;
  a cover coupled to the body part and fixing the fixing part to be capable of a relative motion; and
  a wheel assembly connected to the body part and on which the wheel is provided.

2. The steering system of claim 1, wherein the wheel part comprises a movement restriction part provided at least one of the body part and the cover and restricting a turning angle of the wheel part by selectively contacting the fixing part during a movement of the wheel part.

3. The steering system of claim 2, wherein the movement restriction part protrudes toward the fixing part.

4. The steering system of claim 1, wherein the sensor comprises:
a signal generator provided on one of the fixing part and the wheel part; and
a signal receiver provided on the other one of the fixing part and the wheel part and detecting a turning angle of the signal generator.

5. A steering system comprising:
a fixing part connected to a frame;
a wheel part into which a part of the fixing part is inserted to perform a relative motion and on which a wheel is provided;
a sensor provided between the wheel part and the fixing part and measuring an error angle of the wheel part with respect to a preset initial position of the wheel part;
an input part externally receiving an input of a steering signal;
a steering actuation portion connected to the wheel part and turning the wheel part by generating a steering force; and
a controller calculating a control steering angle of the wheel part based on the steering signal, calculating an actual steering angle for steering the wheel part based on the control steering angle and an error angle of the wheel part measured by the sensor, and controlling the steering actuation portion to generate the steering force calculated according to the actual steering angle.

6. A steering system comprising:
a fixing part connected to a frame;
a wheel part into which a part of the fixing part is inserted to perform a relative motion and on which a wheel is provided; and
a sensor provided between the wheel part and the fixing part and measuring an error angle of the wheel part with respect to a preset initial position of the wheel part,
wherein the fixing part comprises:
a linking part connected to the frame; and
a support frame provided on the linking part and rotatably inserted in the wheel part.

7. The steering system of claim 6, further comprising a bush provided between the support frame and the wheel part.

8. The steering system of claim 1, wherein the sensor measures a turning angle of the wheel part from an initial position of the error angle, and the steering system further comprises:
an input part externally receiving an input of a steering signal;
a steering actuation portion connected to the wheel part and turning the wheel part by generating a steering force; and
a controller calculating a control steering angle of a vehicle corresponding to the steering signal, calculating an expected steering angle corresponding to a direction in which the vehicle moves based on the turning angle measured by the sensor, and controlling the steering actuation portion to make the control steering angle and the expected steering angle the same so as to turn the wheel part.

9. A method of controlling a steering system, the method comprising:
sensing an error angle of a wheel part provided on a fixing part to allow a portion of the wheel part to perform a relative motion, and calculating a control steering angle corresponding to a steering signal input from an input part;
calculating an actual steering angle based on the control steering angle and the error angle; and
driving a steering actuation portion to turn the wheel part by the actual steering angle,
wherein the wheel part comprises a plurality of wheel parts and each of the plurality of wheel parts independently performs the sensing, the calculating, and the driving.

10. The method of claim 9, wherein the actual steering angle is equal to a difference between the control steering angle and the error angle.

11. A method of controlling a steering system, the method comprising:
calculating a steering angle of a vehicle based on a control signal input from an input part;
sensing a turning angle of a wheel part provided on a fixing part to allow a portion of the wheel part to perform a relative motion;
calculating an expected steering angle corresponding to a path along which the vehicle moves according to the turning angle; and
turning the wheel part by driving a steering actuation portion to match the expected steering angle with the steering angle,
wherein the wheel part comprises a plurality of wheel parts and each of the plurality of wheel parts independently performs the sensing, the calculating, and the driving.

12. The method of claim 11, wherein the sensing of the turning angle of the wheel part, the calculating of the expected steering angle, and the turning of the wheel part are sequentially repeatedly performed.

\* \* \* \* \*